US012722267B2

(12) United States Patent
Fedrigon et al.

(10) Patent No.: US 12,722,267 B2
(45) Date of Patent: Sep. 1, 2026

(54) STAPLER LOCKOUT

(71) Applicant: Techtronic Cordless GP, Anderson, SC (US)

(72) Inventors: Jeremy Fedrigon, Greenville, SC (US); Thomas Evatt, Six Mile, SC (US); Neil Wright, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 23 days.

(21) Appl. No.: 18/442,386

(22) Filed: Feb. 15, 2024

(65) Prior Publication Data

US 2024/0286259 A1 Aug. 29, 2024

Related U.S. Application Data

(60) Provisional application No. 63/448,873, filed on Feb. 28, 2023.

(51) Int. Cl.
*B25C 5/16* (2006.01)
*B25C 5/11* (2006.01)
*B25C 1/02* (2006.01)

(52) U.S. Cl.
CPC .............. *B25C 5/1624* (2013.01); *B25C 5/11* (2013.01); *B25C 1/02* (2013.01); *B25C 5/1679* (2013.01); *B25C 5/1689* (2013.01); *B25C 5/1696* (2013.01)

(58) Field of Classification Search
CPC ....... B25C 5/11; B25C 5/1679; B25C 5/1689; B25C 5/1696; B25C 5/1624
See application file for complete search history.

(56) References Cited

U.S. PATENT DOCUMENTS 2,341,530 A 2/1944 Crosby
5,180,091 A * 1/1993 Ota ....................... B25C 5/1689 227/8
5,662,257 A * 9/1997 Mukoyama ............. B25C 1/008 227/8
5,899,374 A * 5/1999 Chen ..................... B25C 5/1696 227/120
6,367,676 B1 * 4/2002 Opland ................. B25C 5/1696 227/123

(Continued)

FOREIGN PATENT DOCUMENTS

CA 1279952 C 2/1991
JP 2004261893 A * 9/2004 ........... B25C 5/1689

OTHER PUBLICATIONS

European Search Report Corresponding to Application No. 24159256 on Aug. 6, 2024.

*Primary Examiner* — Joshua G Kotis
(74) *Attorney, Agent, or Firm* — Dority & Manning, P.A.

(57) ABSTRACT

A stapler includes a body; a handle coupled to the body, the handle movable between a rest position and an actuated position; a magazine configured to support a plurality of fasteners; a driver that successively drives each of the plurality of fasteners into a workpiece in response to the handle moving to the activated position; and an advancer that moves the plurality of fasteners towards the driver, wherein the advancer comprises an advancer body and a lock feature disposed at a leading end of the advancer body, and wherein the driver comprises a complementary lock feature that interfaces with the lock feature of the advancer when the plurality of fasteners is exhausted to lockout the stapler.

19 Claims, 4 Drawing Sheets

(56) References Cited

U.S. PATENT DOCUMENTS

| | | | | |
|---|---|---|---|---|
| 2003/0111239 | A1* | 6/2003 | Smolinski | B25C 1/005 173/8 |
| 2004/0222266 | A1 | 11/2004 | Kakuda et al. | |
| 2006/0169735 | A1* | 8/2006 | Wen | B25C 1/008 227/8 |
| 2006/0213946 | A1* | 9/2006 | Shkolnikov | B25C 5/1665 227/8 |
| 2007/0057012 | A1* | 3/2007 | Kandasamy | B25C 5/0242 227/134 |
| 2008/0223901 | A1* | 9/2008 | Tsai | B25C 5/11 227/120 |
| 2009/0120991 | A1* | 5/2009 | Chen | B25C 5/11 227/8 |
| 2009/0152320 | A1* | 6/2009 | Hu | B25C 5/11 227/132 |
| 2011/0121047 | A1* | 5/2011 | Hu | B25C 5/06 227/8 |
| 2011/0168755 | A1* | 7/2011 | Wang | B25C 5/11 227/120 |
| 2011/0297725 | A1* | 12/2011 | Huang | B25C 5/11 227/140 |
| 2012/0187175 | A1* | 7/2012 | Wu | B25C 1/047 227/8 |
| 2012/0325886 | A1* | 12/2012 | Adachi | B25C 1/008 227/2 |
| 2013/0221056 | A1* | 8/2013 | Chen | B25C 5/1644 227/120 |
| 2013/0228605 | A1* | 9/2013 | Wang | B25C 5/11 227/8 |
| 2014/0231486 | A1* | 8/2014 | Burch | B25C 5/0285 227/63 |
| 2014/0374462 | A1* | 12/2014 | Ebbesson | B25C 5/0242 227/146 |
| 2015/0041516 | A1* | 2/2015 | Chen | B25C 5/11 227/107 |
| 2016/0303726 | A1* | 10/2016 | Hu | B25C 5/1606 |
| 2019/0039219 | A1* | 2/2019 | Suarez | B25C 5/1606 |
| 2019/0160641 | A1* | 5/2019 | Wang | B25C 5/0242 |
| 2019/0240823 | A1* | 8/2019 | Lai | B25C 5/11 |
| 2020/0276690 | A1* | 9/2020 | Hegarty | B25C 1/06 |
| 2020/0346334 | A1* | 11/2020 | Marks | B25C 5/11 |
| 2021/0008702 | A1* | 1/2021 | Wang | B25C 5/11 |
| 2022/0055195 | A1* | 2/2022 | Yeh | B25C 5/11 |
| 2023/0278180 | A1* | 9/2023 | Huang | B25C 5/11 227/8 |

* cited by examiner

STAPLER LOCKOUT

CROSS-REFERENCE TO RELATED APPLICATIONS

The present application claims priority to U.S. Provisional Patent Application Ser. No. 63/448,873 filed on Feb. 28, 2023, the disclosure of which is incorporated by reference herein in its entirety.

FIELD

The present disclosure relates generally to a stapler, and more particularly to a stapler including a lockout feature.

BACKGROUND

Staplers are used to attach objects to workpieces using fasteners. Staplers receive the fasteners from a magazine. The fasteners are biased towards a forward end of the magazine. Once at the forward end of the magazine, the fasteners are individually driven into a workpiece by a driver. The driver is spring biased and operated using a handle. Depressing the handle causes the driver to fire and drive the fastener into the workpiece. When the handle is released, the stapler resets and prepares a successive fastener to be driven into the workpiece by advancing the successive fastener to the forward end of the magazine. This operation is repeated until the stapler is exhausted of fasteners. Once exhausted, damage can occur if the operator dry-fires the stapler, i.e., when the stapler is out of fasteners but the handle is engaged to fire the driver.

Accordingly, improved stapler lockouts are desired in the art. In particular, stapler lockouts which provide cost effective and highly secure lockout protection would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a stapler is provided. The stapler includes a body; a handle coupled to the body, the handle movable between a rest position and an actuated position; a magazine configured to support a plurality of fasteners; a driver that successively drives each of the plurality of fasteners into a workpiece in response to the handle moving to the activated position; and an advancer that moves the plurality of fasteners towards the driver, wherein the advancer comprises an advancer body and a lock feature extending beyond a leading end of the advancer body, and wherein the driver comprises a complementary lock feature that interfaces with the lock feature of the advancer when the plurality of fasteners is exhausted to lockout the stapler.

In accordance with another embodiment, a method of locking out a stapler is provided. The method includes actuating a handle from a rest position to an activated position to drive a driver from a first position to a second position, wherein actuating the handle is performed with a magazine of the stapler holding one or less fasteners, wherein the one or less fasteners is biased towards the driver by an advancer, wherein actuating the handle to the activated position causes the driver to drive the one or less fasteners from the stapler, and wherein actuating the handle to the activated position causes the driver to translate such that a complementary lock feature of the driver passes a lock feature of the advancer; allowing the handle to return from the activated position to the rest position; and causing, by the lock feature of the advancer interfacing with the complementary lock feature of the driver, the driver to lock at a third position between the first and second positions with the handle returned to the rest position.

In accordance with another embodiment, a subassembly for a stapler is provided. The subassembly includes a driver having a driving head to drive a fastener from the stapler and an opening extending into the driver; and an advancer configured to bias the fastener towards the driver, the advancer having a tab extending from the leading end, wherein the tab interfaces with the opening of the driver when the fastener is exhausted to lockout the subassembly and prevent the driver from resetting.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
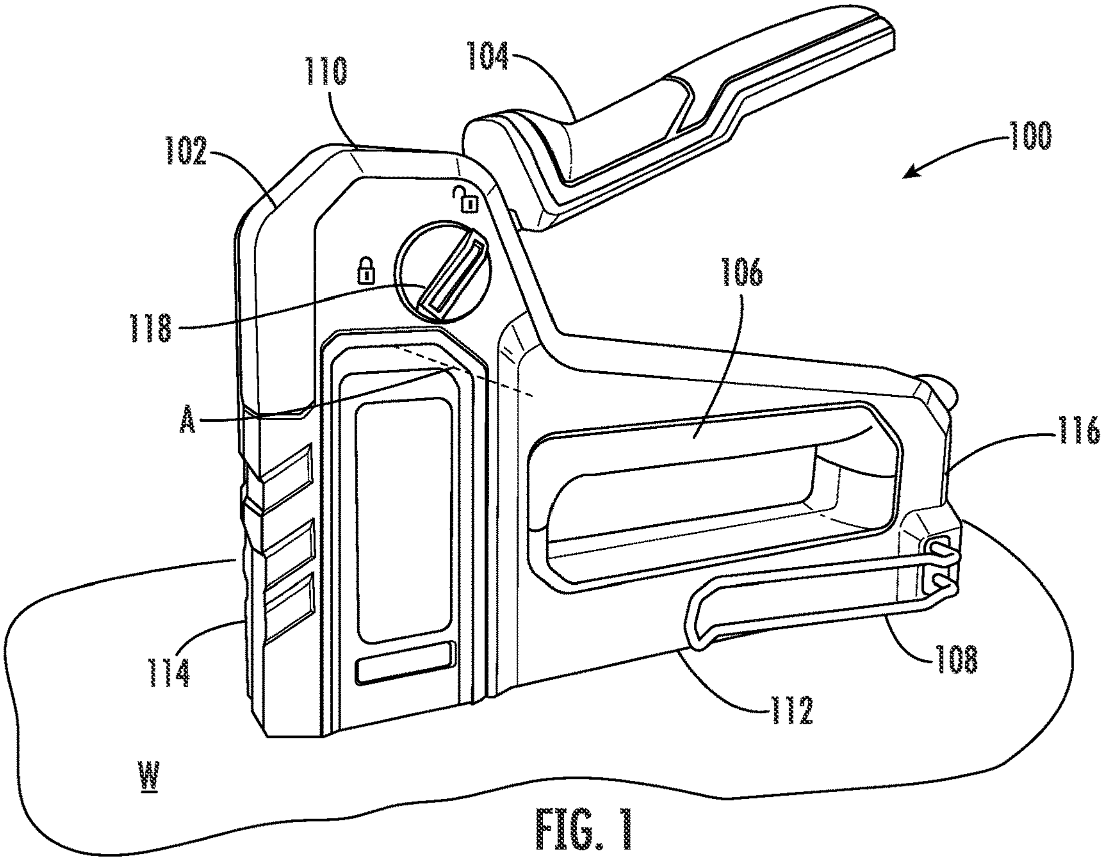
FIG. 1 is perspective view of a stapler in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising." "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

In general, embodiments in accordance with the present disclosure are configured to lockout a stapler when the stapler runs out of (exhausts) fasteners without requiring human intervention, e.g., automatically. Once the stapler is locked out, the user is prevented from repeatedly dry firing the stapler which can damage the stapler or a workpiece being operated on by the stapler. In an embodiment, the lockout feature forms a subassembly of the stapler, the subassembly including a driver and an advancer. The advancer urges fasteners towards a forward end of the stapler where the staples are driven into the workpiece by the driver. The advancer includes a lock feature which mates with a complementary lock feature of the driver such that when the stapler is out of fasteners, i.e., the magazine is exhausted, the lock feature of the advancer interfaces with the complementary lock feature of the driver to lockout the stapler and prevent dry firing.

Referring now to the drawings, FIG. 1 illustrates a stapler 100 in accordance with an example embodiment. The stapler 100 is a type of fastening tool in accordance with an exemplary embodiment described herein that drives fasteners (e.g., staples, brads, and other shaped fasteners) into a workpiece W. The disclosure is not limited to staplers and is intended to be applicable to other types of fasteners. The stapler 100 generally includes a body 102, a handle 104 movably coupled to the body 102, and a grip 106 to allow an operator to gain mechanical advantage to squeeze the handle 104. The stapler 100 can also include an attachment mechanism 108 such as a belt clip for quick storage of the stapler 100, e.g., on a belt or tool attachment wearable by the operator. The stapler 100 can generally define a top end 110, a bottom end 112, a forward end 114, and a rear end 116. In use, the bottom end 112 of the stapler 100 is positioned at, or, or above a workpiece W and the handle 104 is actuated towards the workpiece W to cause a fastener to be driven into the workpiece W by the stapler 100.

A lock 118 can be disposed on, coupled with, or extend through the body 102. By way of example, the lock 118 can include a rotary lock, a rocker lock, a translatable lock, or any combination thereof. The lock 118 allows an operator to selectively lock and unlock the handle 104. With the lock 118 in the locked position, the handle 104 is not movable relative to the body 102. In the unlocked position, as depicted in FIG. 1, the handle 104 is free to move to allow the operator to dispense one or more fasteners from the stapler 100. In an embodiment, the handle 104 moves about a rotational axis A. The axis A may extend parallel with a workpiece W being operated on. The operator can fire the stapler 100, i.e., cause the stapler 100 to dispense a fastener, by rotating the handle 104 about the axis A from the illustrated position in FIG. 1 by a prescribed rotational displacement. After the stapler 100 dispenses the fastener, the operator releases or eases force imparted on the handle 104, causing the handle 104 to return to the reset position. This process can be repeated to successively fire (dispense) fasteners.

Figure 2:
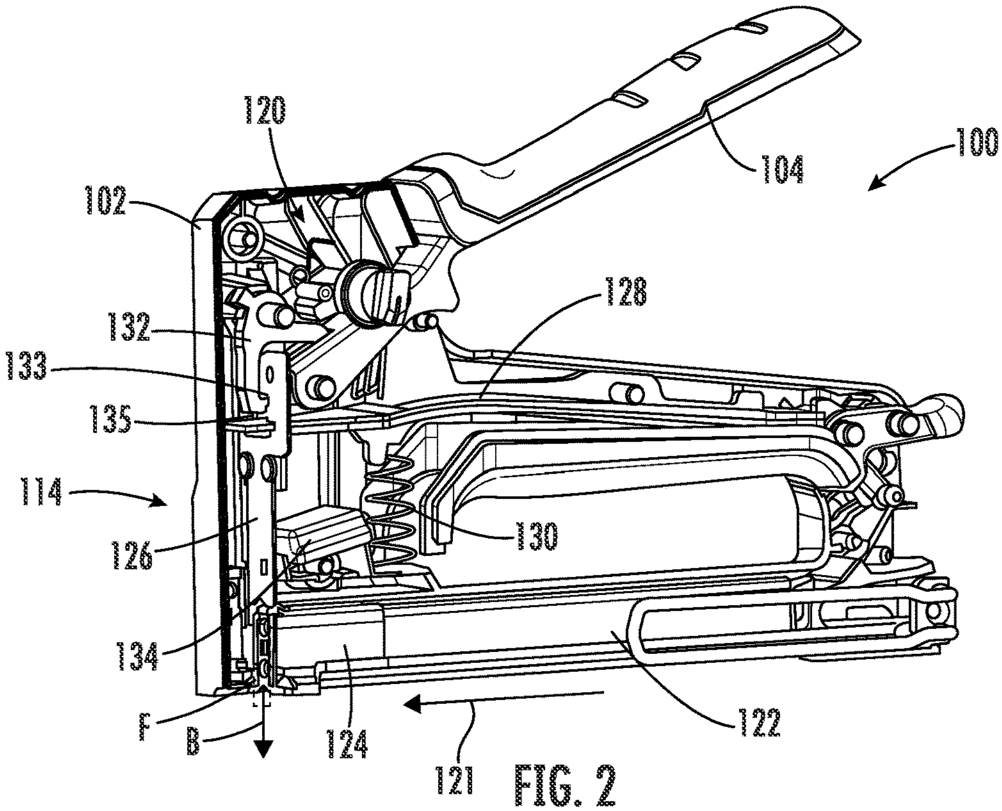
FIG. 2 is a partial cross-sectional perspective view of the stapler as seen with a portion of a body of the stapler removed in accordance with embodiments of the present disclosure.

FIG. 2 illustrates a partial cross-sectional view of the stapler 100 as seen in accordance with an example embodiment. The body 102 can define an internal cavity 120 in which one or more components of the stapler 100 are at least partially disposed within. By way of non-limiting example, these components can include a magazine 122 configured to support a plurality of fasteners, an advancer 124 which moves relative to the magazine 122 in a direction 121 to advance fasteners to the forward end 114 of the magazine 122, a driver 126 disposed at the forward end 114 of the magazine 122 and configured to move in a direction B to drive fasteners into a workpiece and move in a direction opposite to the direction B to reset for a successive fastener driving operation, a biasing element (e.g., a leaf spring) 128 configured to transmit force from the handle 104 to the driver 126 to rapidly urge the driver 126 towards the workpiece when the handle 104 reaches the prescribed rotational displacement, a return element 130 (e.g., a coil spring) configured to return the biasing element 128 to a reset position once the handle 104 is released (or pressure on the handle 104 is eased), and a latching mechanism 132 configured to retain the driver 126 and prevent the driver 126 from firing until the handle 104 reaches the prescribed rotational displacement associated with a firing condition.

As the handle 104 is rotated from the depicted unbiased position (FIG. 2), tension builds in the biasing element 128. While tension builds in the biasing element 128, the driver 126 is held at a relatively fixed location by the latching mechanism 132. For example, the latching mechanism 132 can include a sear 133 which retains an opening 135 of the driver 126, or vice versa. As, or around the time, the handle reaches the prescribed rotational displacement, the latching mechanism 132 releases the driver 126, e.g., the sear 133 slips relative to the opening 135, causing stored energy in the biasing element 128 to rapidly urge the driver 126 to move in the direction B and drive the fastener F into the workpiece. In certain instances, movement of the driver 126 in the direction B may terminate upon the biasing element 128 contacting a stop 134 disposed in the stapler 100. In an embodiment, the stop 134 is integral with the body 102 of the stapler 100. In other instances, the stop 134 can include a discrete body installed in the internal cavity 120 of the body 102. In some instances, the stop 134 may act as a safety for overshoot of the biasing element 128 and not necessarily contact the biasing element 128 with each successive fire. The stop 134 may be dampened to mitigate damage and noise resulting from impact of the biasing element 128.

After driving the fastener F into the workpiece, the biasing element 128 and driver 126 return to the reset position, illustrated e.g., in FIGS. 1 and 2, by urging of the return element 130. This process can be repeated successively until all fasteners contained at the magazine 122 are dispensed (exhausted) or the work has been completed. Continuing to fire the stapler 100, i.e., execute the above-described operation, once the stapler 100 is depleted of fasteners can result in damage to the stapler 100 and/or damage to the workpiece W.

Figure 3:
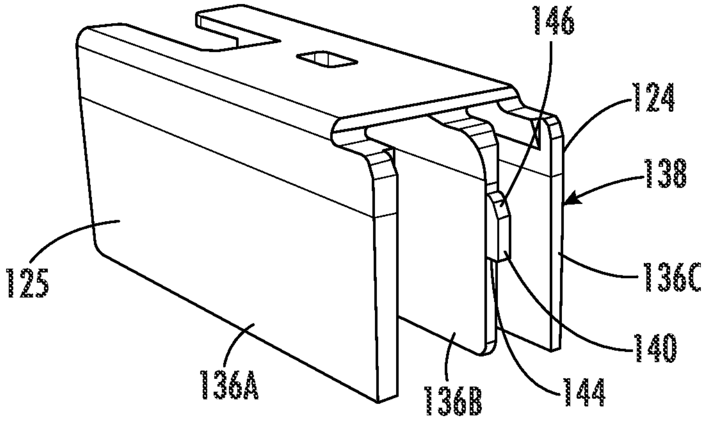
FIG. 3 is a perspective view of an advancer for the stapler in accordance with embodiments of the present disclosure.

FIG. 3 illustrates an enlarged view of the advancer 124 as seen in accordance with an embodiment. The advancer 124 moves along an axis offset from, e.g., oriented perpendicular to, a direction of movement of the driver 126. The advancer 124 can ride along the magazine 122 (FIG. 2) and a leading end 138 of the advancer 124 can push fasteners towards the forward end 114 of the stapler 100 (FIG. 1). In the embodiment depicted in FIG. 3, the advancer 124 includes an advancer body 125 having three legs 136A, 136B, and 136C (i.e., two outer legs 136A and 136C and one inner (middle) leg 136B). The legs 136A, 136B, and 136C can operate in different combinations to advance different sized and shaped fasteners along the magazine 122 such that the stapler 100 can accommodate different types of fasteners. For example, the stapler 100 can accommodate U-shaped fasteners of different sizes, brads, and other shaped fastening elements. Yet other shapes and designs of the advancer 124 are contemplated herein to work with yet other types of fasteners.

In an embodiment, the advancer 124 includes a body 125 having a single-piece construction. The advancer 124 can slide along the magazine 122 (FIG. 2) to advance fasteners towards the driver 126. The advancer 124 includes a lock feature 140 that engages the driver 126 during lockouts. The lock feature 140 can include a portion (such as a tab) of the advancer 124 that extends from one or more of the legs 136A, 136B and/or 136C. In an embodiment, the lock feature 140 is unitary with the advancer body 125, and more particularly, unitary with the middle leg 136B (i.e., the lock feature 140 and middle leg 136B are formed from a single piece).

In an embodiment, the lock feature 140 extends beyond a leading end 138 of the advancer body 125 and interacts with the driver 126 to lock the driver 126 and prevent the driver 126 from resetting (even after the handle 104 is released) while the stapler 100 is out of fasteners. While the lock feature 140 is depicted as being part of the middle leg 136B, in other embodiments, the lock feature 140 can also, or alternatively, be part of another one of the legs, e.g., such as the left leg 136A or the right leg 136C, or a combination of the legs 136A, 136B and/or 136C. The lock feature 140 can include more than one lock feature, such as at least two lock features, at least three lock features, at least four lock features, or the like.

Figure 4:
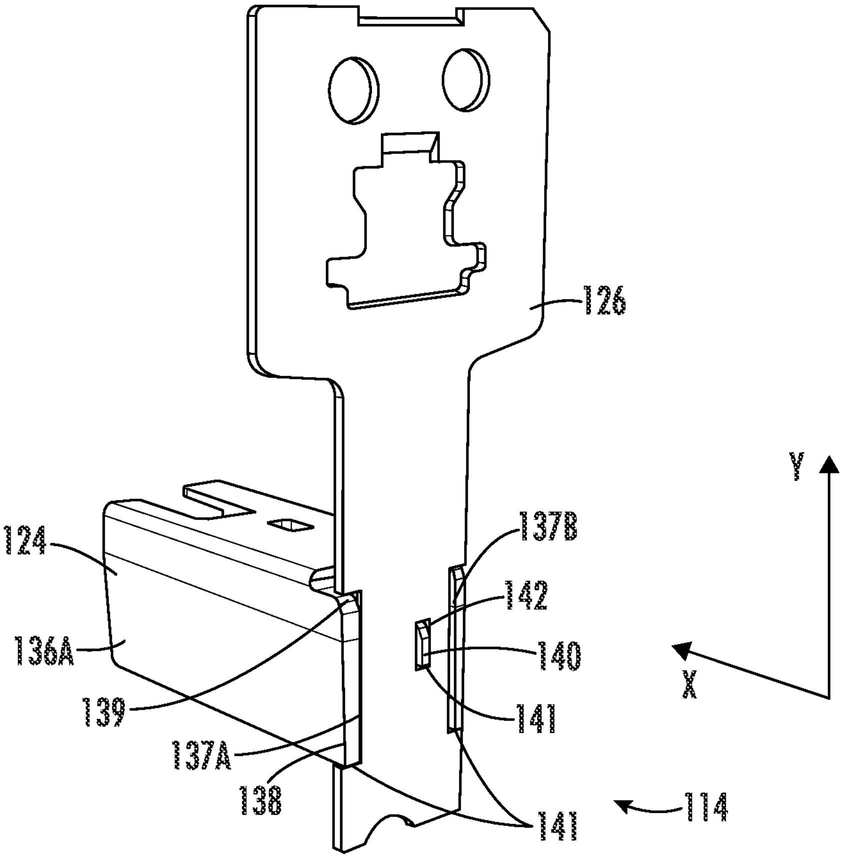
FIG. 4 is a perspective view of a subassembly including the advancer of FIG. 3 and a driver for the stapler in accordance with embodiments of the present disclosure.

FIG. 4 illustrates a subassembly including the advancer 124 as seen once the advancer 124 has reached the forward end 114 of the stapler 100 and interfaces with the driver 126 in the lockout position. A spring (not illustrated) can bias the advancer 124 in a direction along an X-axis towards the forward end 114 of the stapler 100 until the advancer 124 reaches the driver 126. Once the leading end 138 of the advancer 124 reaches the driver 126, which occurs when the stapler 100 is out of fasteners, the lock feature 140 can engage (interface) with a complementary lock feature 142 on the driver 126. In the embodiment depicted in FIGS. 3 and 4, the lock feature 140 comprises a tab extending (protruding) from the leg 136B and the complementary lock feature 142 comprises an opening extending at least partially through the driver 126 and in which the tab extends. In certain instances, the opening can extend only partially through the driver 126 (in a direction along the X-axis). In such a manner, the opening may not be visible when viewed from the forward end 114 of the driver 126. In other instances, the opening can extend entirely through the driver 126 such that the opening is visible from the forward end 114 of the driver 126. The lock feature (e.g., tab) 140 can be retained at the complementary lock feature (e.g., opening) 142 to prevent the driver 126 from returning to the reset position illustrated in FIG. 2.

In an embodiment, the lock feature 140 can have a non-reflectively symmetrical profile about the Y-axis. For example, referring again to FIG. 3, the lock feature 140 can include a lockout surface 144 and a guide surface 146. The lockout surface 144 may lie along a line oriented perpendicular to the leading end 138 of the advancer 124. The lockout surface 144 may additionally, or alternatively, be oriented perpendicular to the direction B of motion (FIG. 2) of the driver 126. The lockout surface 144 can face downward on the Y-axis (i.e., in ordinary use above a workpiece). The locking surface 144 of the lock feature 140 can interact with a sear 141 of the driver 126 to prevent the complementary lock feature 142 of the driver 126 from undesirably unlocking in an upward direction along the Y-axis. Conversely, the guide surface 146 can include an engagement surface that is angularly offset from the lockout surface 144. For example, the guide surface 146 can form a downward taper that allows the driver 126 to move relative to the advancer 124 in a downward direction along the Y-axis as the last fastener is fired. Additionally, by moving over the guide surface 146, the driver 126 can move relative to (pass by) the advancer 124 in the event the stapler 100 is dry fired for a first time after the magazine 122 is removed and reinstalled without additional fasteners.

The following description is an example interaction between the lock feature 140 of the advancer 124 and the complementary lock feature 142 of the driver 126. It should be understood that these operations may be altered and are not intended to be limiting. For example, the described lock feature 140 may instead be part of the driver 126 and the described complementary lock feature 142 can instead be part of the advancer 124.

When fired (driven by the biasing element 128 from the first position), the driver 126 moves towards the workpiece along the Y-axis. The driver 126 reaches a critical distance of travel (which can vary based on the workpiece, fastener type, etc.) referred to hereinafter as the second position. After driving a fastener into the workpiece and reaching the second position, the driver 126 initially begins to move towards the first position. Once the driver 126 is displaced along the Y-axis by a sufficient distance, the lock feature 140 becomes aligned with the complementary lock feature 142 (along both the X- and Y-axis). In instances where additional fasteners remain on the magazine 122, the driver 126 continues to the first position to reset. However, in instances where the magazine 122 is exhausted, the lock feature 140 engages with the complementary lock feature 142 to lockout the driver 126 in a third position, or lockout position. The third (lockout) position can be disposed between the first position (FIG. 2) and the second position. In an embodiment, the third position is disposed closer to the second position than the first position. In another embodiment, the third position may be approximately the same as the second position. In implementations where the biasing element 128 is coupled to the driver 126 such that the driver 126 and biasing element 128 move together (e.g., the driver 126 includes an opening, such as the opening 135 for interacting with the sear 133 of the latching mechanism 132, that also receives the biasing element 128), the biasing element 128 can remain in the third position as a result of the lockout between the advancer 124 and the driver 126.

In the embodiment depicted in FIGS. 3 and 4, the lock feature 140 extends from, e.g., is part of, the middle leg 136B of the advancer 124. The middle leg 136B can be shorter than the outer legs 136A and 136C, as measured along the X-axis. As seen in FIG. 4, the outer legs 136A and 136C may extend into channels 137A and 137B, respectively, of the driver 126 when the lock feature 140 is locked with the complementary lock feature 142. The advancer 124 can include one or more guide surfaces 139 configured to guide the outer legs 136A and 136C into the channels 137A and 137B of the driver 126. The guide surfaces 139 can operate together with the tapered upper surface 146 of the lock feature 140 to generate a smooth action when receiving (locking) the driver 126. In some implementations, at least one of the channels 137A and 137B can have a flat bottom surface 141 to assist in forming a positive engagement with the driver 126 in the locked state depicted in FIG. 4.

Unlocking the driver 126 from the advancer 124 can be performed by moving the magazine 122 (FIG. 2) to an opened position. Referring again to FIG. 2, the magazine 122 can be moved to the open position, for example, by translating the magazine 122 in a direction away from the forward end 114 of the stapler 100. The advancer 124 can be coupled to the magazine 122 in such a manner that moving the magazine 122 away from the forward end 114 causes the advancer 124 to move away from the forward end 114, at least when the magazine 122 is free of fasteners. By translating the advancer 124 away from the forward end 114, the lock feature 140 of the advancer 124 releases from the complementary lock feature 142 of the driver 126 and allows the driver 126 to move from the third (lockout position) to the first (i.e., unbiased) position depicted in FIG. 2. If the magazine 122 is returned and no additional fasteners are installed in the magazine 122 actuation of the handle 104 (i.e., dry firing the stapler 100) causes the driver 126 to again lock relative to the advancer 124 in the third position. However, if additional fasteners are installed in the magazine 122, operation of the stapler 100 resumes without the driver 126 getting locked relative to the advancer 124 until such time that those additional fasteners are exhausted.

Figure 5:
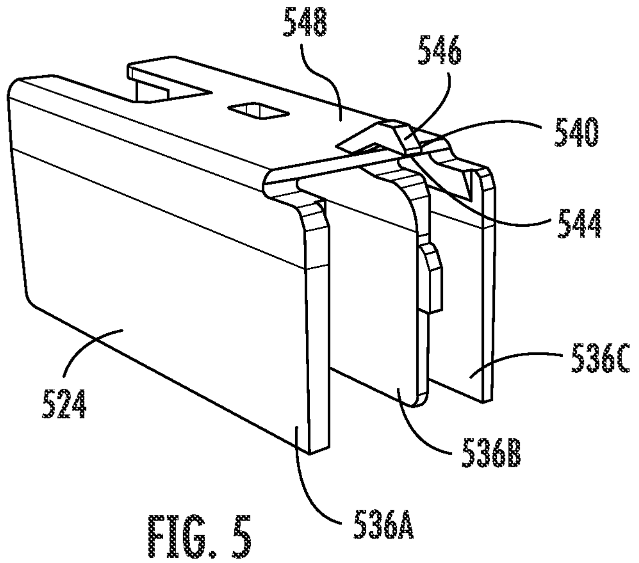
FIG. 5 is a perspective view of an advancer for the stapler in accordance with embodiments of the present disclosure.
Figure 6:
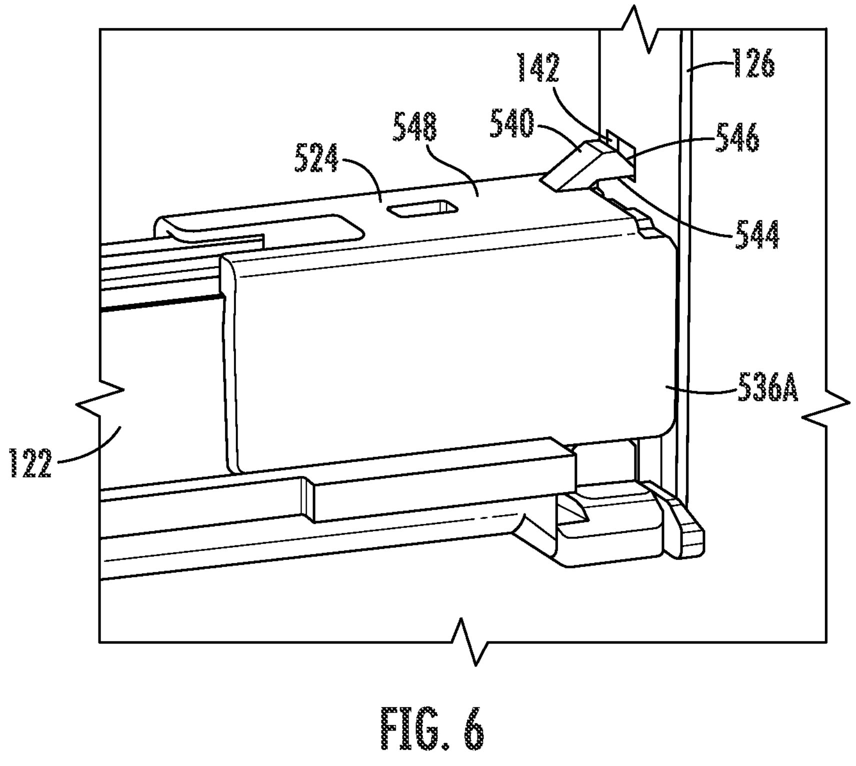
FIG. 6 is a perspective view of a subassembly including the advancer of FIG. 5 and a driver for the stapler in accordance with embodiments of the present disclosure.

FIGS. 5 and 6 illustrate an advancer 524 in accordance with another embodiment of the present disclosure. The advancer 524 can include any one or more features in common with the advancer 124 depicted in FIGS. 3 and 4. In an embodiment, the advancer 524 can include a lock feature 540 disposed along, e.g., above, a connecting member 548 which couples legs 536A, 536B, and 536C of the advancer 524 together. The lock feature 540 can include a locking surface 544 and a guide surface 546. The lock feature 540 can operate in a manner similar to the lock feature 140 depicted, e.g., in FIGS. 3 and 4. However, the lock feature 540 can engage the complementary lock feature 142 of the driver 126 at a location above the advancer 524. Use of the advancer 524 may allow the stapler 100 to function with a diverse range of fastener types as the lock feature 540 does not interfere with engagement of the fastener by the driver 126. For instance, in the embodiment depicted in FIG. 6, the lock feature 540 is disposed above the connecting member 548. At this position, the lock feature 540 does not interfere with a leading end of the advancer 524 where engagement occurs between the advancer 524 and the fastener while the advancer 524 moves along the magazine 122 to push the fastener towards the driver 126. The complementary lock feature 142 can be positioned higher along the body of the driver 126 to accommodate the higher position of the lock feature 540 as compared to the lock feature 140 (FIG. 4). In this regard, the driver 126 can remain at an ideal position with respect to the underlying workpiece during firing operations.

In an embodiment, the lock feature 140, 540 can be integral with the advancer 124, 524. In another embodiment, the lock feature 140, 540 can include a discrete component separate from other portions of the advancer 124, 524. By way of non-limiting example, the lock feature 140, 540 can be coupled to a body of the advancer 124, 524 by a threaded or non-threaded fastener, an adhesive, a weld, an interference fit, a twist-lock, or another mechanical fastening means. In some instances, the lock feature 140, 540 can include a hardened finish to improve longevity and operational lifespan of the stapler 100.

Figure 7:
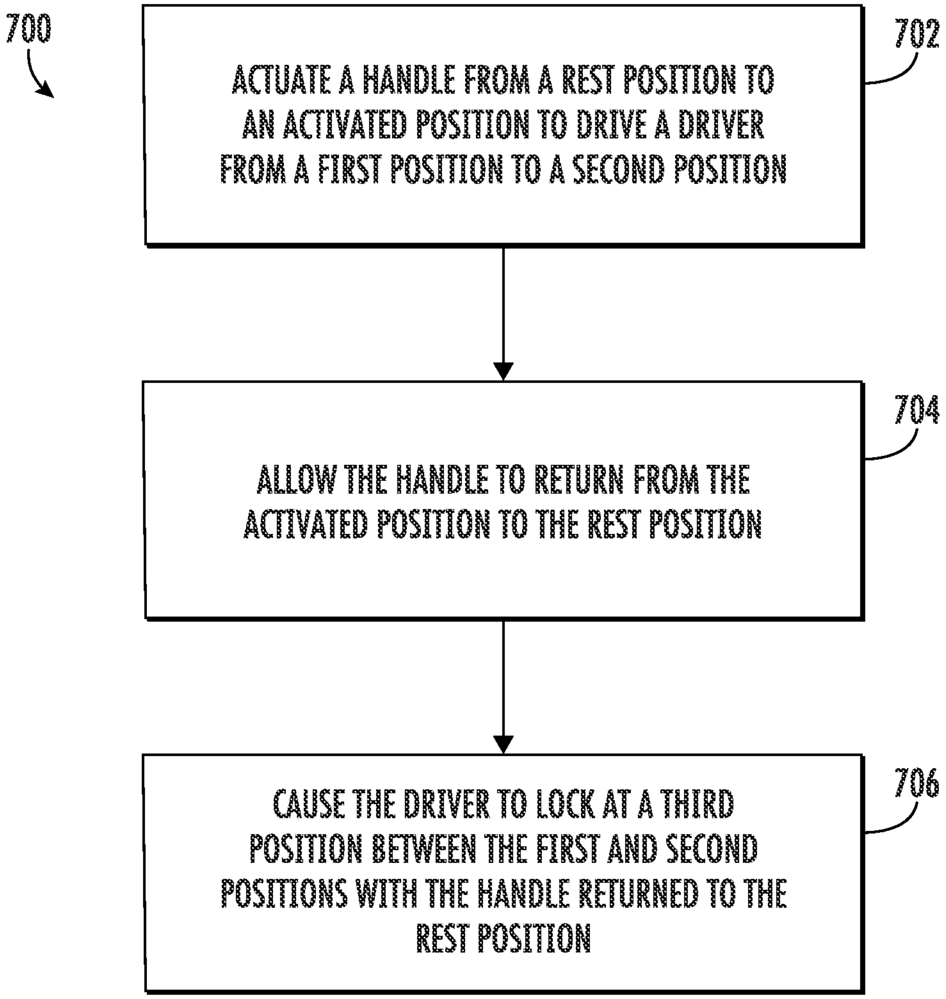
FIG. 7 is a flow diagram of a method of locking out a stapler in accordance with embodiments of the present disclosure.

FIG. 7 illustrates a flow diagram of a method 700 of locking out a stapler in accordance with an example embodiment. In general, the method 700 will be described with reference to a system including the stapler 100 described above. In addition, although FIG. 7 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

The method 700 can include actuating 702 a handle from a rest position to an activated position (e.g., a position associated with a prescribed rotational displacement) to move a driver from a first position to a second position. In an embodiment, the actuating 702 is performed with a magazine of the stapler holding one or less fasteners. For instance, the magazine can hold zero fasteners or one fastener. Thus, actuating 702 the handle either exhausts the fasteners or results in a dry firing of the stapler. Occurrence of either of these events is desired to trigger a lockout state for the stapler which prevents the driver from resetting to the first position (which would permit further dry firing).

In instances where the magazine includes a fastener, the fastener is biased towards the driver by an advancer. The advancer includes a lock feature that is configured to engage with a complementary lock feature on the driver. Actuating 702 the handle to the activated position causes the driver to drive the one or less fasteners from the stapler and causes the driver to translate such that the complementary lock feature of the driver passes the lock feature of the advancer.

The method 700 can further include allowing 704 the handle to return from the activated position to the rest position. In an embodiment, allowing 704 the handle to return to the rest position can include releasing the handle. Releasing the handle can include the user removing their hand from the handle and/or releasing pressure (force) on the handle. With pressure on the handle lessened (or removed), the handle returns to the rest position.

The method 700 can further include causing 706 the driver to lock at a third position between the first and second positions with the handle returned to the rest position. In an embodiment, causing 706 the driver to lock is performed by the lock feature of the advancer interfacing with the complementary lock feature of the driver. For example, causing 706 the driver to lock at the third position can include allowing the driver to translate from the second position in a direction towards the first position, whereby the lock feature interfaces with the complementary feature, i.e., when the lock feature and complementary lock feature are aligned with one another.

The lock feature can include a tab and the complementary lock feature can include an opening. In some instances, interfacing the lock feature with the complementary lock feature includes aligning the tab with the opening and causing, e.g., by a biasing element, the advancer to translate in a direction towards the driver such that the tab engages a sear of the opening.

In some instances, the driver can remain in the third position in response to again actuating the handle from the rest position to the activated position until the lock feature is disengaged from the complementary lock feature. In this regard, the handle can be successively actuated without causing the stapler to dry fire. Disengaging the lock feature from the complementary lock feature can be performed by removing the magazine from the stapler. This causes the advancer to retract from the driver, allowing the lock feature to disengage from the complementary lock feature.

Stapler lockouts described herein, i.e., lock features on advancers which mate with complementary lock features on drivers to lock the driver when fasteners are exhausted, can protect the stapler and workpiece from damage which might otherwise occur during dry firing operations. Stapler lockouts and stapler lockout subassemblies described herein may not require complex hardware or tooling to operate or fix and can be easily integrated into existing designs. In some instances, a subassembly that allows for lockout as described herein can be retrofit into an existing stapler. For example, the driver and advancer of the existing stapler can be replaced with the subassembly (e.g., driver and advancer) described herein. Some additional modifications may be desired.

It should be understood that the lockout features described herein may not be limited to application on advancers and drivers. For instance, a secondary member may move along the magazine along with the advancer, where the secondary member includes the lock feature described herein. The secondary member can be moved by the advancer in at least one direction of motion. Similarly, another secondary member may be coupled to the driver and include the complementary lock feature described herein to retain the driver in the lockout state. Yet further, other types of motion, such as rotational motion of the lock feature and/or complementary lock feature, are contemplated herein. Additionally, it should be understood that reverse operation of the described components can satisfy the lockout system described herein. For example, the lock feature and complementary lock feature may be reversed such that the complementary lock feature of the driver includes the protruding portion of the lockout and the lock feature of the advancer includes the opening portion of the lockout. Yet other modifications can be made without deviating from the scope of the disclosure contained herein.

Further aspects of the invention are provided by one or more of the following embodiments:

Embodiment 1. A stapler comprising: a body; a handle coupled to the body, the handle movable between a rest position and an actuated position; a magazine configured to support a plurality of fasteners; a driver that successively drives each of the plurality of fasteners into a workpiece in response to the handle moving to the activated position; and an advancer that moves the plurality of fasteners towards the driver, wherein the advancer comprises an advancer body and a lock feature disposed at a leading end of the advancer body, and wherein the driver comprises a complementary lock feature that interfaces with the lock feature of the advancer when the plurality of fasteners is exhausted to lockout the stapler.

Embodiment 2. The stapler of embodiment 1, wherein the advancer body comprises: a connecting member; and a plurality of legs each extending from the connecting member, wherein the lock feature extends from one of the plurality of legs.

Embodiment 3. The stapler of any one or more of embodiments 1 or 2, wherein the advancer comprises: a connecting member; and a plurality of legs each extending from the connecting member, wherein the lock feature extends from the connecting member.

Embodiment 4. The stapler of any one or more of embodiments 1 to 3, wherein the lock feature comprises a tab defining a lockout surface and a guide surface, wherein the lockout and guide surfaces are disposed on opposite ends of the tab.

Embodiment 5. The stapler of any one or more of embodiments 1 to 4, wherein the lock feature comprises a tab extending from the advancer body, and wherein the complementary lock feature comprises an opening extending through the driver.

Embodiment 6. The stapler of embodiment 5, wherein the driver further comprises a channel, wherein the advancer body comprises a plurality of legs, and wherein one of the plurality of legs is configured to interface with the channel when the stapler is locked out.

Embodiment 7. The stapler of any one or more of embodiments 1 to 6, wherein an interface between the lock feature and the complementary lock feature when the stapler is locked out is disposed between the advancer body and the handle.

Embodiment 8. The stapler of any one or more of embodiments 1 to 7, wherein the stapler further comprises a biasing element operably coupled between the driver and the handle, wherein moving the handle causes the biasing element to move from a first position to a second position to transmit force from the handle to the driver, and wherein the biasing element moves to a third position between the first and second positions when the handle is allowed to return from the activated position to the rest position.

Embodiment 9. The stapler of any one or more of embodiments 1 to 8, wherein the driver is movable between a first position when the handle is at the rest position, a second position when the handle is at the activated position, and a third position when the stapler is locked out, and wherein the third position is disposed between the first and second positions.

Embodiment 10. A method of locking out a stapler, the method comprising: actuating a handle from a rest position to an activated position to drive a driver from a first position to a second position, wherein actuating the handle is performed with a magazine of the stapler holding one or less fasteners, wherein the one or less fasteners is biased towards the driver by an advancer, wherein actuating the handle to the activated position causes the driver to drive the one or less fasteners from the stapler, and wherein actuating the handle to the activated position causes the driver to translate such that a complementary lock feature of the driver passes a lock feature of the advancer; allowing the handle to return from the activated position to the rest position; and causing, by the lock feature of the advancer interfacing with the complementary lock feature of the driver, the driver to lock at a third position between the first and second positions with the handle returned to the rest position.

Embodiment 11. The method of embodiment 10, wherein causing the driver to lock at the third position comprises: allowing the driver to translate from the second position in a direction towards the first position; and interfacing the lock feature with the complementary lock feature as the driver translates towards the first position.

Embodiment 12. The method of embodiment 11, wherein the lock feature comprises a tab, wherein the complementary lock feature comprises an opening, and wherein interfacing the lock feature with the complementary lock feature comprises: aligning the tab with the opening; and causing, by a biasing element, the advancer to translate in a direction towards the driver such that the tab engages a sear of the opening.

Embodiment 13. The method of embodiment 12, wherein the tab comprises a lockout surface and a guide surface, and wherein causing the tab to engage the sear of the opening is performed by guiding the tab into the opening by the guide surface and engaging the lockout surface of the tab with the sear.

Embodiment 14. The method of any one or more of embodiments 10 to 13, wherein the driver remains in the third position in response to again actuating the handle from the rest position to the activated position until the lock feature is disengaged from the complementary lock feature.

Embodiment 15. The method of embodiment 14, wherein disengaging the lock feature from the complementary lock feature is performed by removing the magazine from a body of the stapler.

Embodiment 16. The method of any one or more of embodiments 10 to 15, wherein actuating the handle causes a biasing element to move from a first position to a second position to transmit force from the handle to the driver, and wherein the biasing element moves to a third position between the first and second positions when the handle is allowed to return from the activated position to the rest position.

Embodiment 17. The method of any one or more of embodiments 10 to 16, wherein the third position is closed to the second position than the first position.

Embodiment 18. A subassembly for a stapler, the subassembly comprising: a driver having a driving head to drive a fastener from the stapler and an opening extending into the driver; and an advancer configured to bias the fastener towards the driver, the advancer having a tab extending from the leading end, wherein the tab interfaces with the opening of the driver when the fastener is exhausted to lockout the subassembly and prevent the driver from resetting.

Embodiment 19. The subassembly of embodiment 18, wherein the advancer comprises a plurality of legs including a central leg, and wherein the tab extends from the central leg.

Embodiment 20. The subassembly of any one of embodiments 18 or 19, wherein the advancer comprises a connecting member and a plurality of legs each coupled to the connecting member, wherein the tab extends from the connecting member, and wherein the connecting member is disposed between the tab and the plurality of legs as seen from a side view of the advancer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stapler comprising:

a body;

a handle coupled to the body, the handle movable between a rest position and an activated position;

a magazine configured to support a plurality of fasteners;

a biasing element that stores energy as the handle is moved from the rest position towards the activated position;

a latching mechanism having a sear;

a driver, wherein the sear restricts movement of the driver relative to the body prior to the handle reaching the activated position, and wherein the sear releases the driver when the handle reaches the activated position to release the stored energy from the biasing element onto one of the plurality of fasteners via the driver to drive the fastener into a workpiece; and an advancer that moves the plurality of fasteners towards the driver, wherein the advancer comprises an advancer body and an advancer lock feature disposed at a leading end of the advancer body, and wherein the driver comprises a complementary driver lock feature that interfaces with the advancer lock feature to lockout the stapler when the plurality of fasteners is exhausted, wherein a guide surface between the advancer lock feature and the driver comprises a downward taper that allows the driver to move relative to the advancer if the stapler is dry fired, and wherein the complimentary driver lock feature comprises an opening extending through the driver.

2. The stapler of claim 1, wherein the advancer lock feature comprises a tab defining a lockout surface and the guide surface, wherein the lockout and guide surfaces are disposed on opposite ends of the tab.

3. The stapler of claim 1, wherein the advancer body comprises:

a connecting member; and a plurality of legs each extending from the connecting member, wherein the advancer lock feature extends from one of the plurality of legs.

4. The stapler of claim 1, wherein the advancer comprises:

a connecting member; and a plurality of legs each extending from the connecting member, wherein the advancer lock feature extends from the connecting member.

5. The stapler of claim 1, wherein the advancer lock feature comprises a tab extending from the advancer body.

6. The stapler of claim 5, wherein lockout occurs when a lockout surface of the tab interfaces with a sear of the opening.

7. The stapler of claim 5, wherein the driver further comprises a channel, wherein the advancer body comprises a leg, and wherein the leg is configured to interface with the channel when the stapler is locked out.

8. The stapler of claim 1, wherein an interface between the advancer lock feature and the complementary driver lock feature when the stapler is locked out is disposed between the advancer body and the handle.

9. The stapler of claim 1, wherein the driver is movable between a first position when the handle is at the rest position, a second position in instances where the handle is at the activated position, and a third position in instances where the stapler is locked out, and wherein the third position is disposed between the first and second positions.

10. A method of locking out the stapler of claim 1, the method comprising:

actuating the handle from the rest position to the activated position to drive the driver from a first position to a second position, wherein activating the handle is performed with the magazine holding one or less fastener, wherein the one or less fastener is biased towards the driver by the advancer, and wherein actuating the handle to the activated position causes the driver to drive the one or less fastener from the stapler;

allowing the handle to return from the activated position to the rest position; and causing, by the advancer lock feature interfacing with the complementary driver lock feature, the driver to lock at a third position between the first and second positions with the handle returned to the rest position.

11. The method of claim 10, wherein causing the driver to lock at the third position comprises:

translating, by the driver, from the second position in a direction towards the first position; and causing the advancer lock feature to engage with the complementary driver lock feature as the driver translates towards the first position.

12. The method of claim 11, wherein the advancer lock feature comprises a tab, wherein the complementary driver lock feature comprises the opening, and wherein causing the advancer lock feature to engage with the complementary driver lock feature comprises:

aligning the tab with the opening; and causing, by a biasing element, the advancer to translate in a direction towards the driver such that a lockout surface of the tab engages a sear of the opening.

13. The method of claim 10, wherein causing the advancer lock feature to engage with the complementary driver lock feature occurs automatically when no fasteners are held by the magazine.

14. The method of claim 10, wherein activating the handle causes the driver to translate such that the complementary driver lock feature of the driver passes the advancer lock feature.

15. The method of claim 10, wherein the driver remains in the third position in response to again actuating the handle from the rest position to the activated position until the advancer lock feature is disengaged from the complementary driver lock feature.

16. The method of claim 15, wherein disengaging the advancer lock feature from the complementary driver lock feature is performed by removing the magazine from the stapler.

17. The method of claim 10, wherein actuating the handle causes a biasing element to transmit force from the handle to the driver, and wherein the biasing element does not return to a starting position when the handle returns to the rest position.

18. A stapler comprising:

a body;

a handle movable between a rest position and an activated position;

a magazine configured to support a plurality of fasteners;

a biasing element that stores energy as the handle is moved from the rest position towards the activated position;

a latching mechanism having a sear; and a driver, wherein the sear restricts movement of the driver relative to the body prior to the handle reaching the activated position, and wherein the sear releases the driver when the handle reaches the activated position to release the stored energy from the biasing element onto one of the plurality of fasteners via the driver to drive the fastener into a workpiece;

an advancer that moves the plurality of fasteners towards the driver;

wherein the advancer comprises an advancer body and an advancer lock feature disposed adjacent to a leading end of the advancer body, and wherein the driver comprises a complementary driver lock feature that interfaces with the advancer lock feature to lockout the stapler when the plurality of fasteners is exhausted wherein the advancer body comprises a connecting member and a plurality of legs each extending from the connecting member, and wherein the advancer lock feature extends from a middle leg of the plurality of legs.

19. The stapler of claim 18, wherein the driver further comprises a plurality of channels configured to receive outer legs of the plurality of legs when the complementary driver lock feature and the advancer lock feature are interfaced.

* * * * *